United States Patent
Potter et al.

(10) Patent No.: US 7,409,337 B1
(45) Date of Patent: Aug. 5, 2008

(54) NATURAL LANGUAGE PROCESSING INTERFACE

(75) Inventors: Douglas W. Potter, Seattle, WA (US); Kevin R. Powell, Kirkland, WA (US); Kevin W. Humphreys, Redmond, WA (US); Jason S. Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 10/813,652

(22) Filed: Mar. 30, 2004

(51) Int. Cl.
*G06F 17/28* (2006.01)

(52) U.S. Cl. .......................................................... 704/9

(58) Field of Classification Search ...................... 704/9
See application file for complete search history.

(56) References Cited

U.S. PATENT DOCUMENTS

| 6,052,525 | A  | * | 4/2000  | Carlson et al.      | 717/100 |
| 6,778,979 | B2 | * | 8/2004  | Grefenstette et al. | 707/3   |
| 6,820,075 | B2 | * | 11/2004 | Shanahan et al.     | 707/3   |
| 7,165,236 | B2 | * | 1/2007  | America             | 717/102 |
| 7,171,352 | B2 | * | 1/2007  | Chang et al.        | 704/9   |

* cited by examiner

*Primary Examiner*—Susan McFadden
(74) *Attorney, Agent, or Firm*—Joseph R. Kelly; Westman, Champlin & Kelly, P.A.

(57) ABSTRACT

The present invention provides an interface and associated object model that exposes a comprehensive set of natural language processing features to an application developer. In one embodiment, the features include lexicon management services and proofing services.

30 Claims, 5 Drawing Sheets

Surface string = *"Send email to George Bush. Forwarf to Bill Gates."*
- Sentence = "Send email to George Bush."
    - Segment = "Send"
    - Segment = "email"
    - Segment = "to"
    - Segment = "George Bush" NE, Person Name
        -- SubSegment = "George" NE, First Name
        -- SubSegment = "Bush" NE, Last Name
- Sentence = "Forwarf to Bill Gates."
    - Segment = "Forwarf" Misspelling
        -- SpellingSuggestion = "Forward"
    - Segment = "to"
    - Segment = "Bill Gates" NE, Person Name
        -- SubSegment = "Bill" NE, First Name
        -- SubSegment = "Gates" NE, Last Name

FIG. 5

NATURAL LANGUAGE PROCESSING INTERFACE

BACKGROUND OF THE INVENTION

The present invention deals with natural language processing. More specifically, the present invention relates to an interface and associated object model for providing integrated natural language processing services to an application.

Natural language processing involves the processing of a natural language input. A natural language input is generally language used by a person (as opposed to a computer language or other artificial language), including all of the idioms, assumptions and implications of an utterance in a natural language input. Natural language processing implemented by a computer is typically an attempt to determine the meaning of a natural language input such that the natural language input can be "understood" and/or acted on by the computer.

In many prior natural language processing systems, natural language processing features have been provided by individual natural language processing components. For instance, such individual components have included language detection which is a process that attempts to detect a language that a natural language input is provided in, word breaking that attempts to identify individual words in a natural language input, spell checking, grammar checking, etc. In conventional systems, each of these components is provided separately. This leads to a number of difficulties.

For instance, a word-breaking component must provide its output in a manner which is consistent with the spell checking component. Similarly, the spell checking component must provide its output in a format acceptable to any downstream processing components. Of course, since these individual natural language processing components are often provided by different vendors, they often do not work seamlessly with one another, without substantial reformatting of the processing results so that they are suitable for the next downstream component.

Similarly, prior natural language processing systems have been configured to provide natural language processing features in a single language only. Therefore, if a developer was working on a multi-language application, the developer would likely need to send a natural language input (to be processed) first to a language detection component, and then call the appropriate natural language processing components, given the identified language.

Further, many of the natural language processing components required a lexicon. In order to add a lexicon, prior natural language processing systems often required the lexicon to be added to multiple individual components. The lexicon might have different format for different components or be incompatible between components. In other words, adding a lexicon was not enabled across multiple components or features.

All of these difficulties, presented as a result of providing individual natural language process components, have greatly benefited application developers that have extensive knowledge about a wide variety of individual components provided by different vendors. This has rendered the development of applications that utilize natural language processing very difficult, costly, and time consuming, and has hindered its widespread dissemination in computing.

SUMMARY OF THE INVENTION

The present invention provides an interface and associated object model that exposes a comprehensive set of natural language processing features to an application developer. In one embodiment, the features include lexicon management services and proofing services.

In one embodiment of the invention, the object model and associated interface integrate those features and provide the integrated set of features across a plurality of different languages.

In still another embodiment, the object model provides an object that is used to configure (or select) desired natural language processing features. This allows the user to easily accommodate a balance between the desired features and the performance of the natural language processing system in terms of speed.

BRIEF DESCRIPTION OF THE DRAWINGS

FIG. 5 illustrates one exemplary output of the system described with respect to FIGS. 3 and 4.

Figure 2:
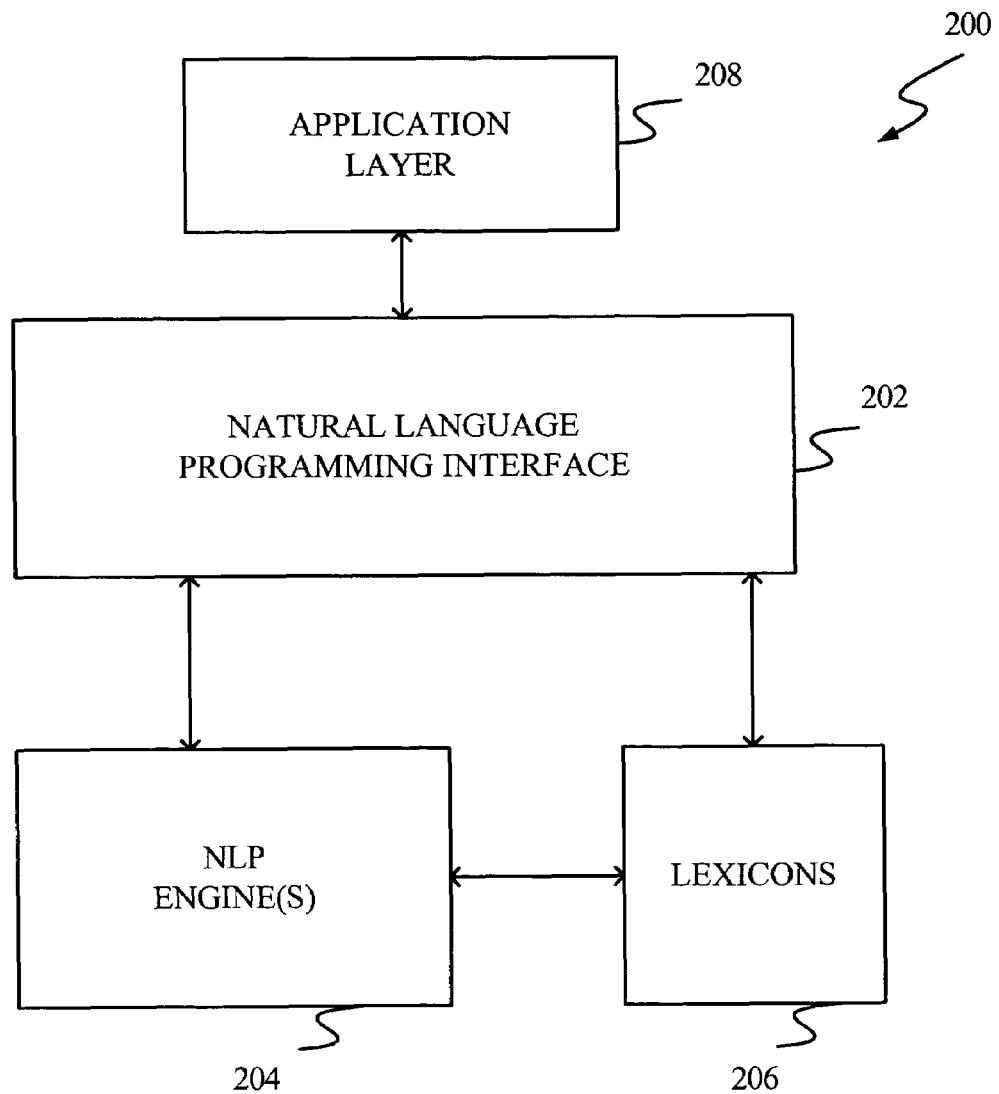
FIG. 2 illustrates a block diagram of one embodiment of a natural language processing system.

Appendix A illustrates one embodiment of a specification for the interface and object model shown in FIG. 2.

DETAILED DESCRIPTION OF ILLUSTRATIVE EMBODIMENTS

The present invention relates to an interface and associated object model for providing natural language processing features, and also sub-processes and individual features provided by the interface and associated object model. However, prior to discussing the present invention in greater detail, one illustrative environment in which the present invention can be used will be described.

Figure 1:
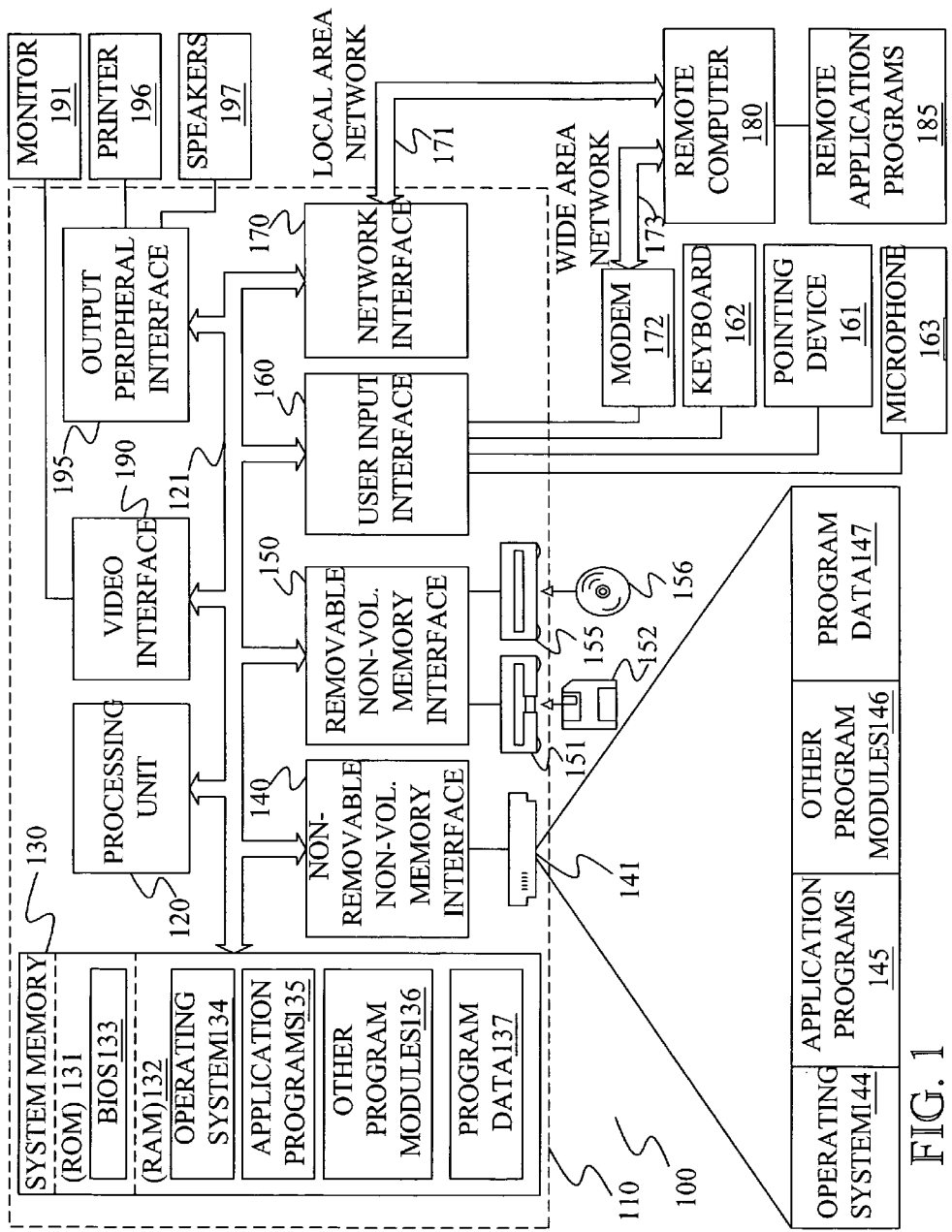
FIG. 1 illustrates one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

FIG. 2 is a block diagram illustrating one illustrative embodiment of a natural language processing system 200 in accordance with the present invention. System 200 includes natural language programming interface 202, natural language processing (NLP) engines 204, and associated lexicons 206. FIG. 2 also illustrates that system 200 interacts with an application layer 208 that includes application programs which require access to natural language processing services.

In accordance with one embodiment of the invention, programming interface 202 exposes members (methods, properties and interfaces) that can be invoked by application layer 208. The members of programming interface 202 are supported by an underlying object model such that an application in application layer 208 can invoke the exposed members to obtain natural language processing services.

In order to do so, an application in layer 208 may first access the object model that exposes interface 202 to configure the interface 202. By configure it is meant that desired natural language processing features or functions are selected. For instance, the application may wish to have spell checking and grammar checking performed$_{[JH1]}$. If so, the spell checking and grammar checking features are selected when configuring interface 202. Similarly, the application may wish to have word breaking or language auto detection performed as well as any of a wide variety of other features or functions. Those features can be selected as well.

Once interface 202 is configured, application layer 208 may provide a text to be processed to interface 202. The interface 202, in turn, can break the text into smaller pieces and access one or more natural language processing (NLP) engines 204 to perform natural language processing on the input text. The results of the natural language processing performed are provided back to the application in application layer 208 through programming interface 202.

Interface 202 or NLP engines 204 can also utilize lexicons 206. In one illustrative embodiment, system 200 provides a core lexicon 206 so no lexicons need to be added. However, in accordance with one embodiment of the invention, interface 202 also exposes members that allow applications to add customized lexicons 206. For example, if the application is directed to medical or legal subject matter, a customized medical or legal lexicon can be added. Of course, other lexicons can be added as well. In addition, in one embodiment, interface 202 exposes members that allow applications to add notations to the lexicon so that when results are returned from a lexicon, the notations are provided as well, as properties of the result. This is described in greater detail below.

One embodiment of natural language programming interface 202 is specified in Appendix A hereto. However, it will be noted that other application programming interfaces can be used as interface 202 as well. Further, even if the interface in Appendix A is used, then the classes identified in Appendix A can be combined or divided into smaller helper classes. Some of the classes can be eliminated and other classes can be added as well. Those shown in Appendix A are illustrative.

Figure 3:
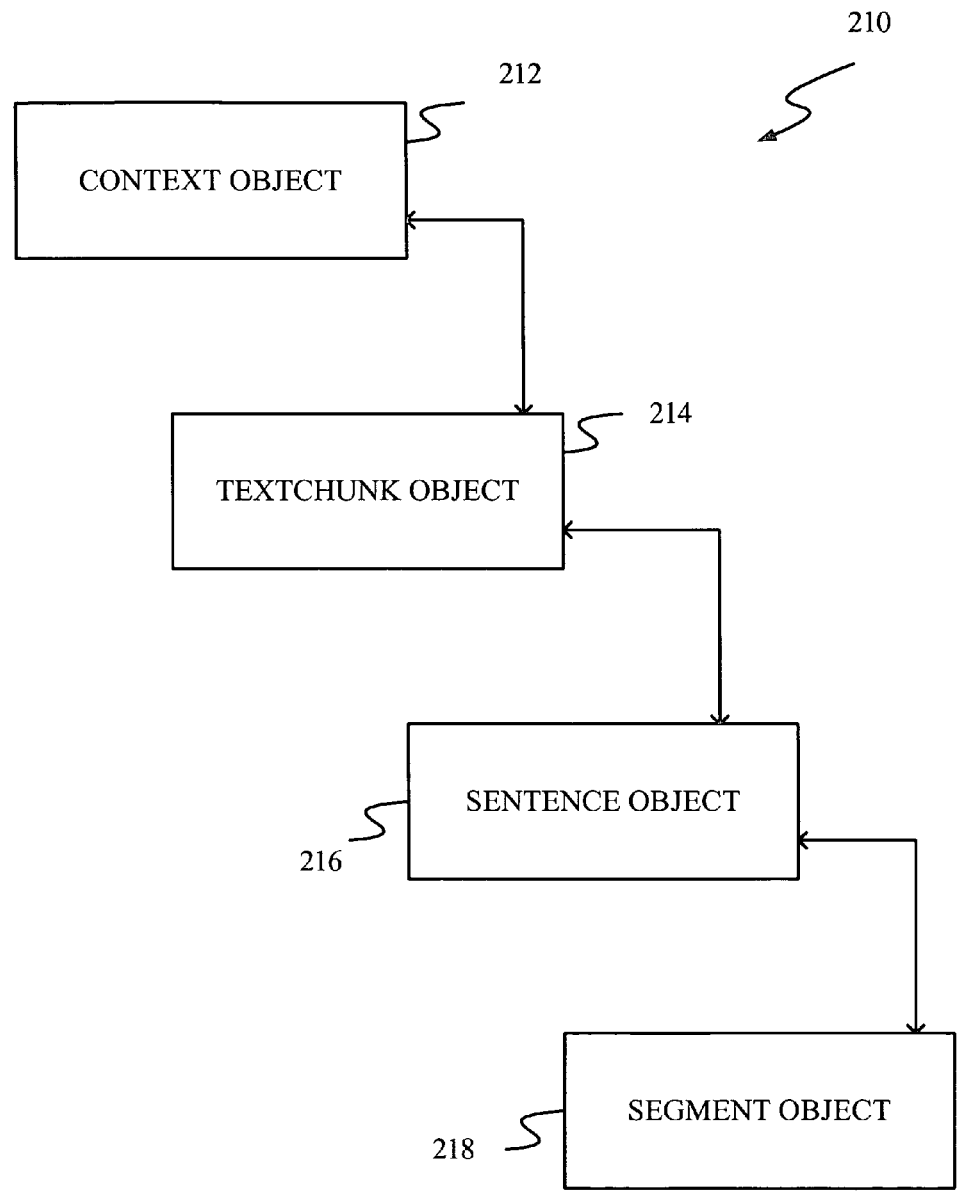
FIG. 3 is a simplified diagram illustrating some salient objects in an object model in accordance with one embodiment of the present invention.

FIG. 3 is a block diagram illustrating a portion of the object model that supports programming interface 202. It will be appreciated that FIG. 3 illustrates only a small number of the primary objects used to implement interface 202, in one embodiment. However, it will be recognized that other helper objects will be used as well, or an entirely different object model could be used to implement interface 202 without departing from the invention. A more full specification of the object model shown in FIG. 3 is set out in Appendix A hereto.

Object model 210 includes. Context object 212, and a plurality of natural language processing objects, such as TextChunk object 214, Sentence object 216, and Segment object 218. The Context object 212 is an object class that is created and used by the application developer to request the specific linguistic features to be analyzed from the text passed to the interface 202. In effect, Context object 212 allows the client to select the natural language processing features and functions which are to be performed on the input text and the results of which are to be returned through programming interface 202. For example, the client can call IsComputingCompounds to perform compound analysis in German, or the IsFindingDateTimeMeasures for named entity recognition of dates and times (e.g., Dec. 31, 2004 is recognized as a single segment with a type of date). Context object 212 is also the object through which developers can query interface 202 for features available for any given language. They can achieve this through the method GetCapabilitiesFor, for example, to determine if spell checking is available for a specific language.

Context object 212, itself, is language independent, but holds references to language dependent lexicons. Once Context object 212 is created and configured by the client, it acts as a read only component during analysis. Several analyses on different threads can refer to a single Context object 212. In one embodiment, thread-safe caching can occur on the Context object, such as for lexicons.

In order for natural language processing system 200 to perform any analysis on a textual input, context information must be input for that text. The context information refers to a configuration for Context object 212. For instance, in order to perform simple parsing on an input text, the context information required can be a number of simple settings, such as the type of parse to be performed and the level of output detail. For command and control scenarios, context information may expand to include the state of the application.

One embodiment of the properties on Context object 212 is set out in greater detail in Appendix A attached hereto. For instance, the client can select a number of items that the natural language processing system is to check for, such as repeated words, spelling, grammar, etc. The client can also configure Context object 212 to return properties such as compound analysis; morphological inflectional forms of words; lemmas; time, date, location, organization and person named entities$_{[JH2]}$; the input text broken by phrases (such as verb phrases, noun phrases, etc.); the normalized version of a token (such as a word); an identity of the lexicons associated with this Context object 212; etc.

The TextChunk object 214 is the object in which the input text (or stream) is placed for analysis and in which the results of analysis are placed to fulfill client requests. The TextChunk object 214 has, as its parent, Context object 212 which contains the context information that tells the associated TextChunk object 214 what natural language processing features are requested on the input text. Application developers can use, for example, the InputText or InputTextArray properties to provide the text. They can also set the CultureInfo for the text. Setting an explicit CultureInfo indicates that the application developer knows the language of the input text. Setting it to a null value (the default) illustratively instigates the language detection behavior which automatically detects the language of the input text. The SingleLanguage property in Context object 212 illustratively determines the behavior of allowing the language to be set for a Sentence object 216 or the TextChunk object 214.

One embodiment of TextChunk object 214 is described in greater detail in Appendix A, and it exposes methods that provide the client results of various analyses.

Amongst other things, the TextChunk object 214 represents a collection of Sentence objects 216 that the client can iterate to find the sentences in the TextChunk. The Sentence object contains the results of analysis on that sentence that are required to fulfill client requests (or requests from an application). Thus, sentence object 216 has properties that provide information about the text. An example of this is the Culture property that provides the culture (i.e., the language) for the sentence represented by Sentence object 216, and the Range property that provides the range covered in the original text. It also produces a collection of Segment objects 218 which further separate the input text and its analysis.

The Segment object 218 is illustratively represented by a class of objects. Amongst other things, the Sentence object is a collection of Segment objects. The Segment object 218 illustratively represents the text and its properties commonly associated with words or multiple word entries. Properties of Segment object 218 are associated with the segments such as the range of the segment. Other properties identify different characteristics of the segment associated with a particular Segment object 218.

Figure 4:
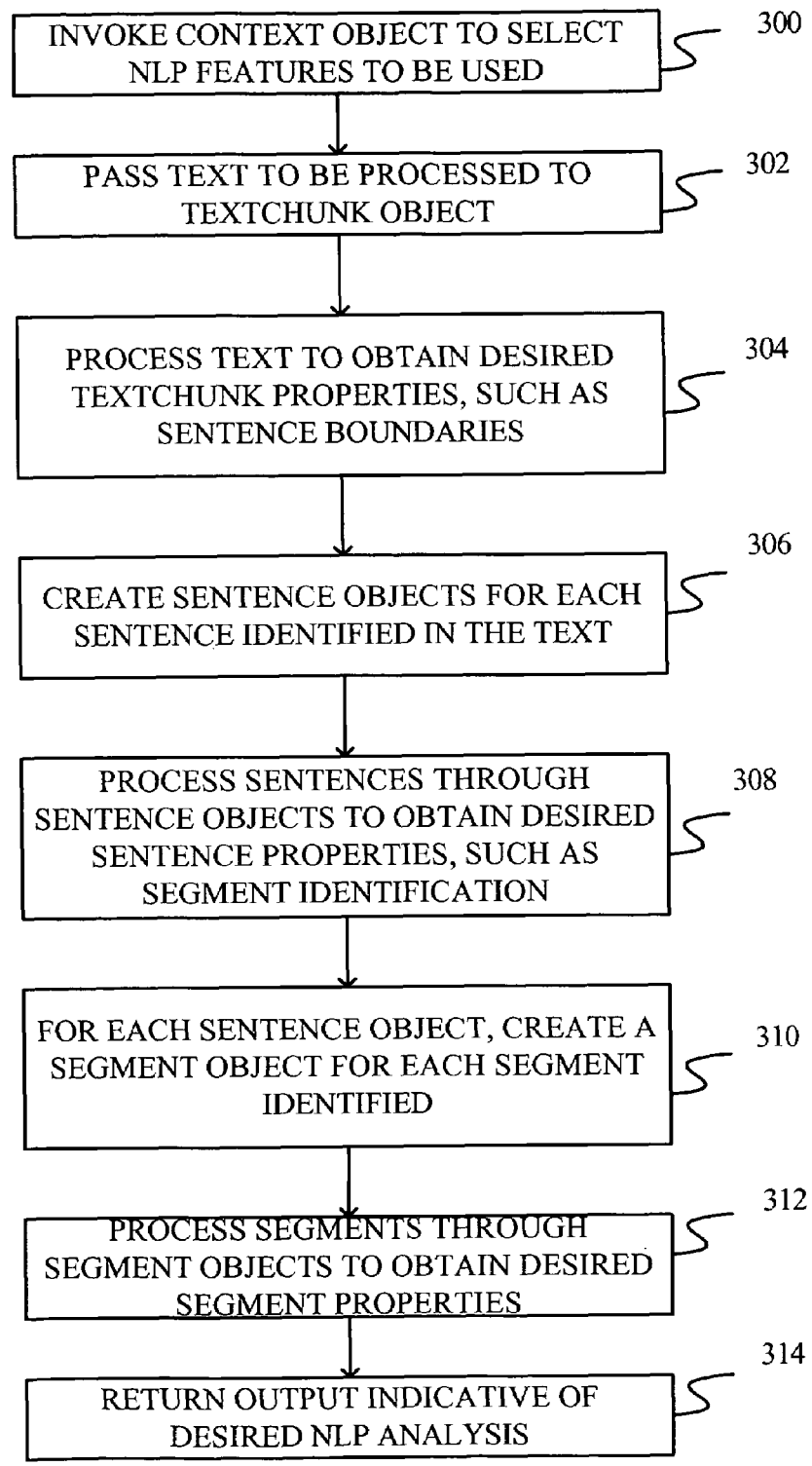
FIG. 4 is a flow diagram illustrating the operation of an instance of the object model shown in FIG. 3, in accordance with one embodiment of the present invention.

FIG. 4 is a flow diagram illustrating the operation of object model 210 in order to show how a number of natural language processing features can be selected and performed on input text. Of course, the flow diagram in FIG. 4 illustrates but one process for performing natural language analysis on an input text, and many others can be used as well. In the example illustrated in FIG. 4, assume that the input text is "Send email to George Bush. Forwarf to Bill Gates."

First, the application instantiates and invokes Context object 212 to select natural language processing features to be used. This is indicated by block 300 in FIG. 4, and is done by invoking methods and setting desired properties on an instance of Context object 212. This can be done at text analysis time, or before hand.

Assume, for example, that in block 300 the developer has specified that the natural language processing is to recognize Named Entities and offer spelling suggestions. The developer (or client) does this when configuring the Context object 212 by setting the appropriate properties on Context object 212.

For instance, in order to set spell checking, the client sets the property IsCheckingSpelling. In order to recognize Named Entities, the client sets the property IsFindingPersons.

The application next passes text to be processed into a TextChunk object 214. This is indicated by block 302. Again, this is done by the application invoking the appropriate methods on TextChunk object 214 to pass the text to be analyzed to the object.

The TextChunk object 214 then invokes one or more natural language processing engines 204 or similar functional components, to process the text passed to it in order to obtain desired TextChunk properties, such as sentence boundaries. This is indicated by block 304 in FIG. 4. Of course, to the extent other TextChunk properties are desired, TextChunk object 212 illustratively obtains the results of corresponding natural language analysis on the input text in order to return those properties as well.

In the example being discussed, TextChunk object 214 receives the text array and computes sentence boundaries of the text. TextChunk object 214 illustratively determines that there are two sentences and creates corresponding sentence objects 216 for each of those sentences. Creating Sentence objects 216 for each sentence identified in the input text is indicated by block 306 in FIG. 4.

The sentences in each Sentence object 216 are then processed (such as by NLP engines 204 in system 200) to obtain desired sentence properties, such as segment identification. Although a wide variety of other properties could be returned for a sentence, the segment identification is discussed herein for the sake of example only. This is indicated by block 308 in FIG. 4.

Within each Sentence object 216, for each segment identified, a Segment object 218 is created. This is indicated by block 310 in FIG. 4. The segments in the example being discussed are illustratively words. Therefore, one segment object is associated with each word in the sentences identified in the input text.

The segments (words) are then processed (again, for example, using NLP engines 204 in system 200) through the Segment objects 218 to obtain desired properties. The properties are illustratively Subsegments and spelling suggestions for misspelled words. Processing the segments is indicated by block 312 in FIG. 4.

Once the segment-level processing has been performed by system 200, system 200 returns a natural language output that is indicative of the desired natural language processing analysis requested by the application, and configured using the Context object. This is indicated by block 314 in FIG. 4.

One illustrative example of a natural language processing analysis of the input text is illustrated in FIG. 5. The analysis (or result) shown in FIG. 5 first presents the surface string (or input text) provided to TextChunk object 214. The result shown in FIG. 5 next shows the sentences identified in the surface string. Next, the result shown in FIG. 5 shows how each sentence was divided into segments and subsegments. As requested on the Context object 212, Named Entities are recognized ("George Bush" and "Bill Gates") and spelling suggestions are provided for misspelled words ("forward" is suggested for "forwarf").

While a wide variety of other operations can be performed using the interface set out in Appendix A, and while they can easily be identified simply by reviewing Appendix A, lexicon management is now discussed in greater detail.

It is worth noting at the outset, however, that in one embodiment, one or more core lexicons can be provided by system 200 so no other lexicons need to be added. Lexicons 206 (first shown in FIG. 2) are also illustratively available across all of the features and languages that are serviced by programming interface 202. Therefore, while in prior systems lexicons needed to be loaded for each specific natural language processing component or engine, the present invention provides one or more core lexicons in system 200, and allows additional lexicons to be loaded into system 200, and those lexicons can be shared across all services and languages supported. System 200 does this by simply providing an appropriate method or property (such as the Lexical property) which can be used to load a lexicon into system 200. The lexicon is then available to the natural language processing engine 204.

The present invention also allows notations to be added to results returned from a given lexicon. For instance, interface 202 allows, a medical lexicon 206 to be added to a natural language processing system 200. The medical lexicon may include, for example, a dictionary of drugs indexed by drug name. When the lexicon returns a result indicating that one of the drugs in the drug dictionary was recognized, that will be indicated, for example, in a Segment object 218 corresponding to the segment that holds the drug name. The segment object 218 has a corresponding plurality of properties, and one of those properties can contain the annotations desired. For instance, the annotations corresponding to the drug name recognized in the medical lexicon may include recommended dosages for that given drug, common side effects, notes on how to administer the drug, etc. With this information in a property on the Segment object, it can be selected and used as desired by the application that requested the natural language processing.

Another feature of the present invention that is worth noting is that the language identification feature (LanguageAutoDetect) is integrated across all of the services offered by the present invention as well. For instance, in prior systems, the language autodetection component was a separate component from the other natural language processing engines or components. Therefore, the output of the language autodetection component needed to be consistent (or made consistent through additional processing) with the outputs from the other components in the system. The present invention, however, provides language autodetection through interface 202 and thus provides language autodetection as an integrated service for all other services (such as spell checking, compound analysis, grammar checking, etc.) supported by the system.

It can also be seen that the present invention allows the developer to choose the level of analysis, given the corresponding offset in speed. For instance, the more natural language analysis to be done on a given input text, the more time will be required to perform that natural language processing. Therefore, by providing all of the features in the natural language processing system 200 as being selectable through the Context object 212 in interface 202, the present invention allows the developer to quickly and easily select only those features of natural language processing analysis that are desired and thus to quickly and easily make a determination as to the trade off between performance (in terms of speed) and depth of analysis.

Further, the present invention integrates all natural language processing features into a single package, such that those features are accessible through a single interface. This removes from the developer the requirement of insuring that each individual natural language processing engine or component provides an output that is consistent with the other natural language processing engines or components in the system. Thus, the present invention significantly eases the burden of developers in implementing natural language processing analysis into their applications.

Although the present invention has been described with reference to particular embodiments, workers skilled in the art will recognize that changes may be made in form and detail without departing from the spirit and scope of the invention.

What is claimed is:

1. An object model for supporting an application programming interface to a natural language processing system that performs natural language processing on a natural language input, comprising:
   a first set of classes including context information, selected by the client, to represent a selected natural language processing (NLP) analysis set, the selected NLP analysis set being a selected one or more of a plurality of NLP analyses selected by the client to be performed on the natural language input by one or more NLP engines; and
   a second set of classes receiving as an input the natural language input, performing the NLP analysis on the natural language input, and providing, as an output, analysis results for the selected NLP analysis set represented by the first set of classes.

2. The object model of claim 1 wherein the first set of classes comprises a context class including the context information; and wherein the second set of classes comprises a text class associated with the context class and invoked by an application and configured to receive the natural language input and provide the analysis results for the desired NLP analysis set in the associated context class.

3. The object model of claim 1 wherein the first set of classes exposes the context information to integrate the plurality of NLP analyses across multiple languages.

4. The object model of claim 1 wherein the first set of classes exposes the context information to integrate the plurality of NLP analyses across multiple lexicons.

5. The object model of claim 1 wherein the context information is included in members exposed by the first set of classes.

6. The object model of claim 1 wherein the context information includes a culture member indicative of whether automatic language detection is to be used.

7. The object model of claim 1 wherein the context information includes a lexicon member configured to load additional lexicons into the NLP system.

8. The object model of claim 1 wherein the context information includes a capabilities member indicative of NLP capabilities of the NLP system for a given language.

9. The object model of claim 1 wherein the context information includes a repeated words member indicative of whether the NLP system is to check for repeated words in the natural language input.

10. The object model of claim 1 wherein the context information includes a compound member indicative of whether the NLP system is to perform compound word analysis on the natural language input.

11. The object model of claim 1 wherein the context information includes an inflection member indicative of whether the NLP system is to generate morphological inflections of words in the natural language input.

12. The object model of claim 1 wherein the context information includes a lemma member indicative of whether the NLP system is to identify lemmas or stems of words in the natural language input.

13. The object model of claim 1 wherein the context information includes a Named Entity member indicative of whether the NLP system is to check for Named Entities in the natural language input.

14. The object model of claim 1 wherein the context information includes a normalization member indicative of whether the NLP system is to identify normalizations for the natural language input.

15. The object model of claim 1 wherein the context information includes a single language member indicative of whether the natural language input is all in a single language.

16. The object model of claim 1 wherein the context information includes a spelling member indicative of whether the NLP system is to perform spelling related services on the natural language input.

17. The object model of claim 2 wherein the text class includes a TextChunk class having members exposed to receive the natural language input.

18. The object model of claim 17 wherein the TextChunk class has one or more members exposed to identify sentences of the natural language input already processed.

19. The object model of claim 17 wherein the TextChunk class has an exposed context member configured to identify the associated context class.

20. The object model of claim 17 wherein the text class includes a Sentence class having members exposed to receive a sentence in the natural language input.

21. The object model of claim 20 wherein the Sentence class includes members exposed to indicate analysis results for the sentence.

22. The object model of claim 20 wherein the Sentence class includes members exposed to indicate whether the sentence is an end of a paragraph in the natural language input.

23. The object model of claim 22 wherein the Sentence class includes members exposed to identify a tokenization of the sentence.

24. The object model of claim 22 wherein the NLP class includes a Segment class associated with a portion of the natural language input and having members exposed to indicate the analysis results of the selected NLP analysis set for the associated portion of the natural language input.

25. The object model of claim 24 wherein the members exposed by the Segment class include an alternative member indicative of an alternative tokenization of the associated portion of the natural language input.

26. The object model of claim 24 wherein the members exposed by the Segment class include one or more semantic analysis members indicative of results of a semantic analysis of the associated portion of the natural language input.

27. The object model of claim 24 wherein the members exposed by the Segment class include one or more syntactic analysis members indicative of results of a syntactic analysis of the associated portion of the natural language input.

28. The object model of claim 24 wherein the members exposed by the Segment class include one or more part-of-speech analysis members indicative of results of a part-of-speech analysis of the associated portion of the natural language input.

29. The object model of claim 24 wherein the members exposed by the Segment class include one or more lexicon members indicative of a recognition of the associated portion of the natural language input by a lexicon.

30. The object model of claim 29 wherein the one or more lexicon members include an annotation property that identifies annotations associated with an entry in the lexicon that spawned the recognition.

* * * * *